United States Patent Office 3,462,104
Patented Aug. 19, 1969

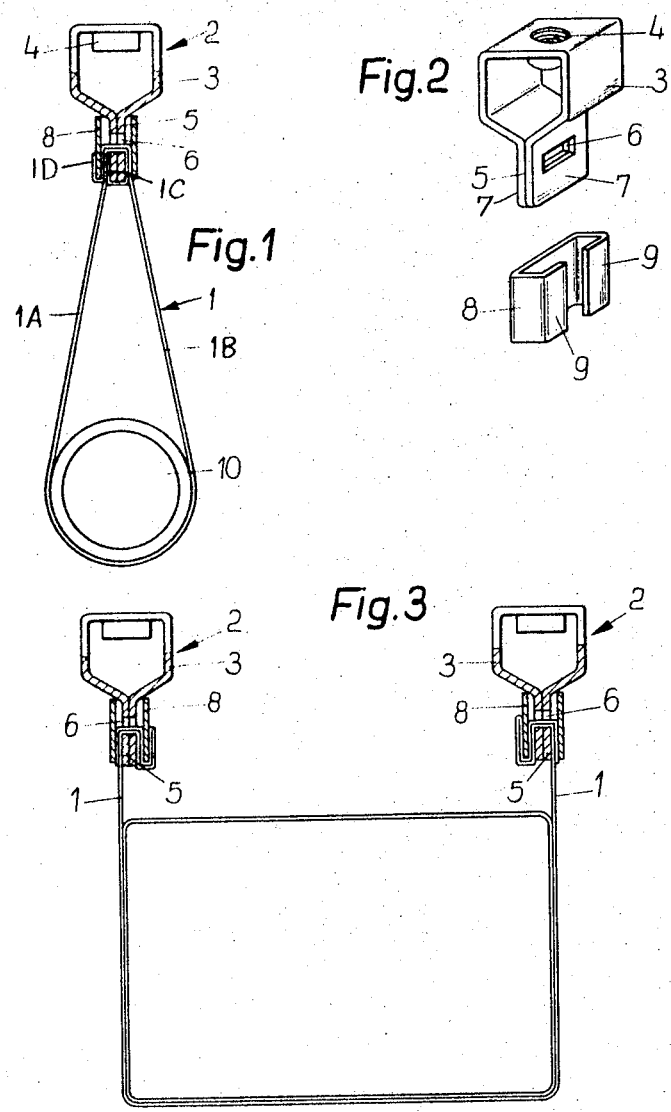

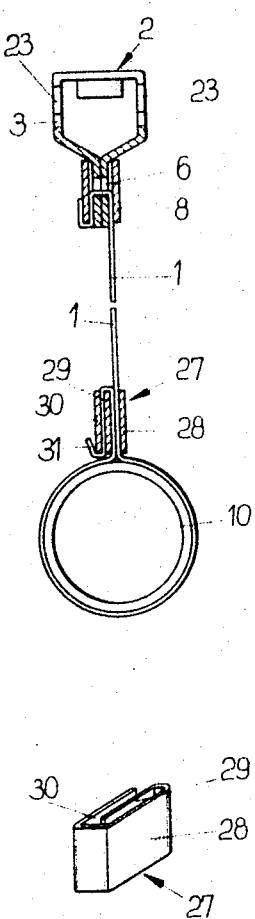
Fig. 11
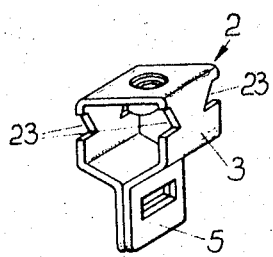
Fig. 12
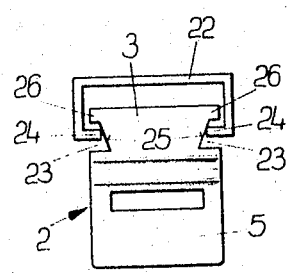
Fig. 13
Fig. 14

3,462,104
SUSPENSION MEANS
Franz Johann Jakob Müller and Helmut Müller, both of 132 Konigsteiner Strasse, Frankfurt am Main-Unterliederbach, Germany
Filed Mar. 2, 1967, Ser. No. 620,055
Claims priority, application Germany, Mar. 3, 1966, M 68,610
Int. Cl. F16l 3/02
U.S. Cl. 248—62
16 Claims

ABSTRACT OF THE DISCLOSURE

A device for suspending an object, such as a pipe, from a support surface, such as a ceiling, is disclosed herein to have a carrier which is adapted to be secured to the support surface and which mounts a shackle. A suspension band looped around the object passes through a slot in the shackle and is secured thereto by a clamping ring.

The invention refers to hangers or suspension devices with which objects, such as tools, pipes or similar things, can be suspended from the ceiling of a room or other structures.

Suspension devices are known to consist of a carrier piece, which is to be attached to the ceiling or something similar, and a suspension band which is attached to the carrier piece at its ends and encircling the object that is to be suspended. This type of suspension device is known for the continuous or sensitive adaption of the height of the chuck of the suspension to the particular requirements. The known suspension devices (U.S. Patent 2,289,-995) show a carrying piece which is enlarged conically downward to the side surfaces of which the suspension band has been fitted and clamped down with a clamping ring expanding conically downwards. The ends of the suspension band are then bent over the upper edge of the clamping ring on its outside surface. These known suspension devices all have the disadvantage, however, that they can be mounted only with relatvie difficulty and with great skill, that the clamping ring must carry the real load of the object which is suspended. With such a load it is unavoidable that the clamping ring stretches so that it will slide together with the suspension band along the conical surface of the carrying piece and that, under certain circumstances, it will even slide off the carrier piece, so that the suspended object will drop down. Finally, this known suspension device cannot absorb any shocks exerted from down below and against the suspended object, such as someone pushing inadvertently against such a suspended object in a storeroom or other place.

As compared with the foregoing, it is the purpose and primary object of the invention to provide a novel suspension device which is particularly simple in construction, easy and simple to assemble, absolute safety in operation, and safe against thrusts applied against the direction in which the suspension band is tensioned.

This is achieved by the invention by providing the carrying piece with an attaching shackle projecting downwards, on which an essentially horizontally stretching slit and lateral abutting surfaces below the slit have been provided. According to this invention, the suspension band is bent over, guided with at least one end through said slit, and clamped with a clamping ring to the contact surfaces of the attaching shackle. In this manner, the pull prevailing in the suspension band is now transferred directly via the slit of the attaching shackle to the carrying piece, and the clamping ring will not have to absorb any kind of pulling forces. In the assembly, it is possible to draw the suspension band through the slit of the attaching shackle in a simple manner up to a point, until the correct height of the suspension has been reached for the purpose of a sensitive, continuous adjustment of the height of the chuck. All that is left then is merely to bend over the suspension band and to pull the clamping ring over it. Through the load-free arrangement of the clamping ring, the suspension device is absolutely safe and reliable to operate. Any kind of thrusts against the suspended object are transferred merely to the suspension band and no longer to the attachment of the suspension band at the attaching shackle.

In a preferred design of the invention, one can provide a device for the swinging [i.e., pendulating] attachment of the suspension band. As a result the suspension device may be adapted to any conceivable requirements and can be used for the suspension of any imaginable object.

The suspension device according to this invention may have a single carrier piece. In such cases, the suspension band is guided with one of its ends through the slit of the attaching shackle and then bent over, and is then guided with the second end over its first end through the same slit and is then bent over this first end. The suspension device according to this invention may, however, also have two carrying pieces with an attaching shackle for each, with slits extending transversely, enabling the suspension band to be attached with one end each to one carrier piece each.

Further objects of this invention will appear as the description proceeds in connection with the annexed claims and appended drawings wherein:

FIGURE 1 shows a partially sectioned elevation of the suspension device constructed according to this invention and having a single carrying piece;

FIGURE 2 is a perspective view of the carrier piece and the clamping ring shown in FIGURE 1;

FIGURE 3 shows a partially sectioned elevation of another embodiment in which the suspension device of this invention is provided with two carrier pieces, partially in section;

Figure 4:
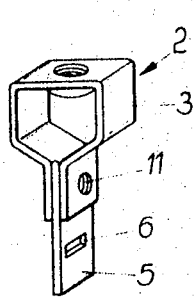
Figure 5:
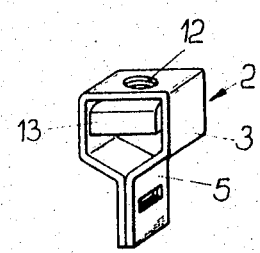
Figure 6:
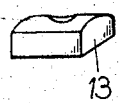
Figure 7:
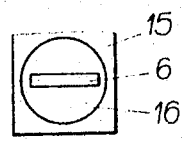
Figure 8:
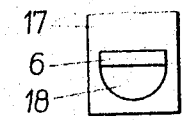
Figure 9:
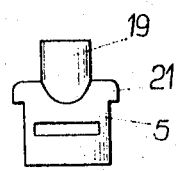
Figure 10:
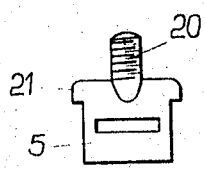

FIGURES 4 and 5 each show in perspective a variation of a carrier piece for the suspension device of this invention;

FIGURE 6 is a perspective view of a swiveling nut for the carrier piece shown in FIGURE 5;

FIGURES 7 and 8 respectively, show different swiveling shackles for a carrier piece of this invention;

FIGURES 9 and 10 respectively, show different constructions of the carrier piece for this invention;

FIGURE 11 shows a further embodiment of a suspension device with a simple suspension band;

FIGURE 12 is a perspective view of a further embodiment of the carrier piece for this invention;

FIGURE 13 is a side view of the carrier piece shown in FIGURE 12 and assembled with a Y; and FIGURE 14 is a perspective view of an attaching clamp used in the embodiment of FIGURE 11 for the lower end of the suspension band.

In the embodiment of FIGURE 1, the pipe suspension comprises a suspension band 1 and a carrier piece 2. The carrier piece 2 consists of a band-shaped metal piece of an essentially greater thickness than the suspension band 1 and is shaped, at its upper part, into a head 3 in which a female thread 4 (see FIGURE 2) is formed. In the downward direction, the two ends of the band forming carrier piece 2 are placed together to provide an attaching shackle 5 which has a transversely extending slit or slot 6. Below the slit 6, attaching shackle 5 is formed on each side with a contact surface 7. As shown in FIGURE 1, the left-hand end portion 1A of band 1 is first passed from left to right through slot 6 of attaching shackle 5 and then downward along the right-hand contact surface 7. From there band 1A passes from right to left along the lower edge of shackle 5 and its terminal portion 1C is bent upward to lie along the left-hand contact surface 7. The suspension band extends down from end portion 1A around the object that is to be suspended, such as, for example, a pipe 10, and its right end portion 1B extends upwardly toward the carrier piece. This right end portion 1B extends in superposed relation over the left end portion 1A at the right side of the shackle, through slot 6 and down at the left side of the shackle. Clamping ring 8 is drawn across the bent over band end portions and terminal portion 1D of end portion 1B is bent under the lower edge of the clamping ring 8 and the upward to lie along its outside surface.

As shown in FIGURE 2, clamping ring 8 is formed with a slit extending axially, so that it has a first closed side and a second side formed by two resilient pressing shackles 9.

The embodiment of FIGURE 3 is useful for suspending bulky objects, such as, for example, instruments or something similar. In this embodiment the suspension device has two carrier pieces 2 and each end of suspension band 1 is attached to an individual carrier piece 2. The band end is then passed through the slit 6 so that it is pressed through the clamping ring 8 against the two contact surfaces 7 of the attaching shackle 5. In both cases of application, the head 3 of the carrier piece 2 has been widened in relation to the attaching shackle 5 so that when the clamping ring 8 is pushed upward beyond the slit 6, it abuts with its upper edge against the lower side of the head 3 of the carrier piece 2. In this position, it is held by the last band end that is bent back upon its outside and guided around its lower edge.

In using the embodiment of FIGURE 3, the carrier piece 2 and the clamping ring 8, which are of the same construction as in the embodiment of FIGURE 1, the two ends of the band according to FIGURE 3 are reversed; thus they are doubly guided through slit 6 so that they are also lying in a double layer on the contact surface 7 of the attaching shackle 5.

In FIGURES 4 to 8, devices for the pendulating attachment of the suspension band are shown. In the embodiment of FIGURE 4, the attaching shackle 5 is attached by means of a pin 11 in the carrier piece 2, swivelably around a horizontal axis, so that the attaching shackle 5 and the suspension band attached to it can pendulate around the pin 11.

In the embodiment of FIGURE 5, the carrier piece has been changed in relation to the carrier pieces of FIGURES 1 to 3, in such a manner that the female thread 4 has been replaced by a simple enlarged bore hole 12. The screw bolt, attached to the ceiling or something similar, extends through bore hole 12 and into a pendulum nut 13, with the carrier piece 2 resting on the arched upper side 14 of said nut and, as a result of that has itself been suspended pendulatingly, so that the suspension band 1, attached to its attaching shackle 5, is suspended swinging with the object carried by it.

In the embodiment of FIGURE 7, the attaching shackle 15, which is attached firmly to the lower part of the carrier piece 2, is provided with a circular recess, into which a circular swivel carriage 16 is inserted. The slit 6, at the same time, is formed in the swivel carriage 16, so that the slit with the suspension band 1 held in it can be swiveled in relation to the carrier piece 2. In the embodiment of FIGURE 8, the attaching shackle 17, which is arranged firmly at the carrier piece, is provided with a semi-circular recess or cavity disposed below the slit 6 and into which a semi-circular swivel carriage 18 is inserted. At the same time, the slit 6 is formed broader than in the case of the other embodiments given by way of example, so that it will allow a sufficient clearance for swinging the semi-circular swivel carriage and the suspension band 1 resting on it.

In FIGURES 9 and 10, comparatively simple constructions of the carrier piece are shown. Here the carrier piece is formed essentially rigid with the plate-shaped attaching shackle 5, a nut 19 or a screw bolt 20 being set on its upper part.

The plate-shaped attaching shackle 5 and the nut 19 or the screw bolt 20, at the same time can be cast in one piece or else they can be welded together. The lower end of the nut 19 or the screw bolt 20 could already form the support for the clamping ring 8. For the improvement of the support for the clamping ring 8, however, a supporting projection 21 may be formed at the upper end of the attaching shackle 5 on each side.

A further construction of the carrier piece 2 is shown in FIGURES 12 and 13. In the case of this design, the carrier piece 2 is particularly suitable for introduction into a Y 22. In the example of FIGURES 12 and 13, we started out from the basic development of the carrier piece according to FIGURE 2, whereby however one could just as well provide a carrier piece with a swiveling attaching shackle 5 according to FIGURE 4. As compared with a carrier piece according to FIGURE 2, or perhaps a carrier piece according to FIGURE 4, the head 3 of the carrier piece 2 in FIGURE 12 is provided with four lateral recesses 23, with which, as shown in FIGURE 13, the shanks 24 of the Y 22 engage or mesh from the side. The lateral recesses 23 are formed more deeply in their lower part and flatter in their upper part with an obliquely running floor edge 25 in such a manner, that the head 3 of the carrier piece 2 can be slid freely back and forth in the Y 22 whenever it is lifted up and thus when the shanks 24 are located in the lower part of the recesses 23. If the suspension device is loaded, then the carrier piece 2 is pulled downwards, so that edges 25 of the recesses 23 will glide along shanks 24 of Y 22 and position themselves along the latter as shown especially in FIGURE 13. The downward movement of carrier piece 2 in relation to Y 22 is limited through the supporting flanges or legs 26, which form the upper termination for the recesses 23. In that case, the carrier piece 2 rests under load in a wedged-in position in the Y 22 on supporting flanges 26.

Additionally, the head 3 of the carrier piece 2 also has the female thread 4 in this design so that this carrier piece can be used practically universally, especially if its attaching shackle is swiverable corresponding to the embodiment of FIGURE 4.

FIGURE 11 shows a simplified suspension device of this invention. In this example, suspension band 1 is used only singly and is passed only singly through attaching slit 6 of carrier piece 2. For this purpose, a correspondingly narrower clamping ring 8 is used. But it would also be possible without any trouble to place the suspension band 1 doubly at the upper end and to attach it to the carrier piece 5 as shown and explained in the embodiment of FIGURE 3.

On the lower end, the suspension band 1 is passed around the object that is to be suspended, such as, for example, around pipe 10. The ends of the band which extend above pipe 10 have been held together and secured through an attaching clamp 27. This clamp 27 is shown in perspective in FIGURE 14. It consists of a strip of a steel band whose middle sector 28 is laid against the rear side of the suspension band 1. The outside sector 29 is then bent over the end sector coming from below, of the suspension band 2 [sic] and is pressed against it, so that the band 1 coming from above and its end area coming from below from the direction of the object 10 are jammed in between the middle sector 28 and one of the lateral sectors 29 of the clamp 27. The end of the suspension band 1 still projecting beyond the clamp 27 is then bent downward across the side sector 29 of the clamp. The second side sector 30 of the clamp 27 is then bent over above that from the side and is pressed on, as a result of which the suspension band 2 [sic] is secured within the clamp 27. A last additional safety can still be achieved through the fact that the last little end piece 31 of the suspension band, which now still projects from below the clamp 27, is bent upward onto the outside of the outside side sector 30 of the clamp 27, as indicated in FIGURE 11.

This design of the suspension device according to the invention shown in FIGURE 11 is particularly simple and cheap, and has been intended especially for the suspension of smaller loads.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A device for suspending an object from a support structure such as a ceiling comprising a carrier piece adapted to be attached to said structure and being provided with a downwardly extending shackle, a suspension band adapted for supporting said object below said shackle, said shackle having a substantially horizontally extending slot and opposite side surfaces disposed below said slot, said band having both of its end portions extending through said slot in superposed relation and bent over and downwardly from said slot to seat parts thereof against both of said side surfaces, and a ring-like clamp member extending around and clamping said parts against said side surfaces to secure the band to said shackle.

2. The device defined in claim 1 wherein said clamp member extends upwardly beyond said slot and beyond the bent regions of said band and is urged inwardly towards a support portion forming a part of said carrier piece and providing a connection for securing said carrier piece to said support structure.

3. The device defined in claim 2 wherein said clamp member has a width which is somewhat smaller than the height of said shackle.

4. The device defined in claim 2 wherein said clamp member is provided with resilient ends pressing against said band portions to urge it into contact with said surfaces.

5. The device defined in claim 1 wherein said band is supported for swinging movement on said carrier piece.

6. The device defined in claim 5 comprising a swivel nut, a heading forming a part of said carrier piece and being seated on said nut, and a bolt adapted to be secured to said structure and threaded into said nut.

7. The device recited in claim 1, wherein one end portion of said band extends upwardly from the object adjacent one of said side surfaces and is bent to pass through the slot, downwardly in contact with the opposite side surface of the shackle and under the shackle to terminate in a terminal portion lying in contact with said one side surface of the shackle, and the other end portion of said band extends upwardly from the object and is formed in generally U-shape to pass through the slot and lie in superposed relation over said one end portion of the band at the shackle and is bent under the lower edge of the clamp member and upwardly to provide a terminal portion lying along the outer surface of said clamp member.

8. A device for suspending an object from a support structure such as a ceiling comprising at least one carrier piece adapted to be attached to said structure and being provided with a downwardly extending shackle, a suspension band looped around and supporting said object below said shackle, said shackle having a horizontally extending slot and lateral contact surfaces disposed below said slot, said band having at least one end extending through said slot and being bent over an edge of said slot to seat portions thereof against said lateral surfaces, and said shackle comprising a swivel carriage in which said slot is at least partially formed for supporting said band for swinging movement about a horizontal axis, and a ring-like member clamping said portions against said lateral surfaces to secure the band to said shackle.

9. The device defined in claim 8 wherein said carriage is circular.

10. The device defined in claim 8 wherein said carriage is semi-circular.

11. A device for suspending an object from a support structure such as a ceiling comprising at least one carrier piece adapted to be attached to said structure and being provided with a downwardly extending shackle, a head forming a part of said carrier piece and having recesses opening laterally outwardly in opposite directions and a Y piece adapted to be secured to said structure and having opposed inwardly turned ends extending into said recesses to support said carrier piece, a suspension band looped around and supporting said object below said shackle, said shackle having a horizontally etxending slot and lateral contact surfaces disposed below said slot, said band having at least one end extending through said slot and being bent over an edge of said slot to seat portions thereof against said lateral surfaces, and a ring-like member clamping said portions against said lateral surfaces to secure the band to said shackle.

12. The device defined in claim 11 wherein the bottoms of said recesses diverge in an upward direction to wedge said head between said ends of said Y piece.

13. The device defined in claim 12 wherein said head is formed at the upper ends of said recesses with a support flange which is adapted to engage said ends of said Y piece to limit downward displacement of said carrier piece.

14. A device for suspending an object from a support structure such as a ceiling comprising at least one carrier piece adapted to be attached to said structure and being provided with a downwardly extending shackle, a suspension band looped around and supporting said object below said shackle, said shackle having a horizontally extending slot and lateral contact surfaces disposed below said slot, said band having one end extending through said slot and being bent over an edge of said slot to seat portions thereof against said lateral surfaces and having its other end secured to an intermediate section of the band by a clamping member, and a ring-like clamp member clamping said portions against said lateral surfaces to secure the band to said shackle, said clamp member comprising a U-shape strip having parallel legs, with one of the legs being longer than the other of said legs and terminating in an end section, said end section being reversely bent to extend back between opposed faces of said legs, and said opposite end of said band extending upwardly between one side of said end section and the opposing face of said one leg and being reversely bent over the upper edge of said end section to extend downwardly between the other side of said extended section and the opposing face of said other leg.

15. In a hanger for suspending an object from an overhead structure, a carrier piece comprising a head having at opposite sides similar laterally open recesses formed to provide upwardly diverging faces, a suspension band attached to said carrier piece and providing support for said object, and a support member adapted to be attached to said structure, said support member having opposed inwardly extending arms extending toward each other into said recesses into engagement with said diverging faces whereby the load of said object tends to wedge the carrier piece against said support member, and said recesses being sufficiently deep in the vertical direction to permit said carrier piece to be lifted away from said faces as for displacement along the support member.

16. A device for suspending an object from a support structure such as a ceiling comprising a carrier piece adapted to be attached to said structure and provided with a downwardly extending shackle, a suspension band supporting said object below said shackle, said shackle having a horizontally extending slot and lateral contact surfaces on both sides below said slot, said suspension band having its upper end extending through said slot and being bent over the lower edge of the slot to seat portions thereof against said lateral surfaces, and a ring-like clamp member clamping said band portions against said lateral surfaces to secure the band to said shackle, the lower end of said suspension band being looped around said object and being secured to an intermediate section of the suspension band by a clamping member, said clamping member comprising a U-shaped strip having parallel legs, with one of the legs being longer than the other of said legs and terminating in an end section, said end section being reversely bent to extend back between opposed faces of said legs, the opposite end of said band extending upwardly between one side of said end section and the opposing face of said one leg and being reversely bent over the upper edge of said one side of the end section to extend downwardly between the other side of said extended section and the opposing surface of said other leg.

References Cited

UNITED STATES PATENTS

| | | | |
|---|---|---|---|
| 566,690 | 8/1896 | Kling | 248—62 |
| 2,007,820 | 7/1935 | Tucker | 248—61 |
| 2,289,995 | 7/1942 | Powers | 248—60 |
| 3,284,037 | 11/1966 | Muller | 248—74 |

FOREIGN PATENTS 703,320  2/1965  Canada.

CHANCELLOR E. HARRIS, Primary Examiner

U.S. Cl. X.R.

24—196, 265; 248—317

UNITED STATES PATENT OFFICE
CERTIFICATE OF CORRECTION

Patent No. 3,462,104 August 19, 1969

Franz Johann Jakob Müller et al.

It is certified that error appears in the above identified patent and that said Letters Patent are hereby corrected as shown below:

Column 1, line 41, "relatvie" should read -- relative --.
Column 5, line 49, "heading" should read -- head --.

Signed and sealed this 10th day of February 1970.

(SEAL)
Attest:

Edward M. Fletcher, Jr.
Attesting Officer

WILLIAM E. SCHUYLER, JR
Commissioner of Patents